United States Patent
Cho

(10) Patent No.: US 10,661,995 B2
(45) Date of Patent: May 26, 2020

(54) TROLLEY CONVEYOR ROLLER ASSEMBLY

(71) Applicant: Jong Il Cho, Gyeonggi-do (KR)

(72) Inventor: Jong-Won Cho, Gyeonggi-do (KR)

(73) Assignee: Jong Il Cho, Gyeonggi-do (KR)

( * ) Notice: Subject to any disclaimer, the term of this patent is extended or adjusted under 35 U.S.C. 154(b) by 0 days.

(21) Appl. No.: 16/481,828

(22) PCT Filed: Aug. 31, 2018

(86) PCT No.: PCT/KR2018/010114
§ 371 (c)(1),
(2) Date: Jul. 29, 2019

(87) PCT Pub. No.: WO2019/050219
PCT Pub. Date: Mar. 14, 2019

(65) Prior Publication Data
US 2020/0055677 A1 Feb. 20, 2020

(30) Foreign Application Priority Data
Sep. 6, 2017 (KR) .................. 10-2017-0113740

(51) Int. Cl.
*B65G 17/20* (2006.01)
*B65G 39/02* (2006.01)
(Continued)

(52) U.S. Cl.
CPC ............ *B65G 17/20* (2013.01); *B65G 9/002* (2013.01); *B65G 39/02* (2013.01); *B65G 39/09* (2013.01);
(Continued)

(58) Field of Classification Search
CPC ...... B65G 9/002; B65G 17/20; B65G 19/025; B65G 39/02; B65G 39/09; B65G 39/10;
(Continued)

(56) References Cited

U.S. PATENT DOCUMENTS 4,113,328 A * 9/1978 Vander Meulen ..... B65G 39/09
384/482
4,617,867 A * 10/1986 Ameteg .................. A47H 15/02
105/154
(Continued)

FOREIGN PATENT DOCUMENTS

JP 2005-053618 A 3/2005
KR 2003683370000 11/2004
(Continued)

OTHER PUBLICATIONS

English translation of International Search Report dated Dec. 10, 2018, for corresponding PCT Application No. PCT/KR2018/010114.

*Primary Examiner* — Gene O Crawford
*Assistant Examiner* — Keith R Campbell
(74) *Attorney, Agent, or Firm* — Kinney & Lange, P.A.

(57) ABSTRACT

The present invention relates to a roller assembly for a trolley conveyor that moves along a rail track including a flange and a web. The roller assembly for a trolley conveyor includes a pair of brackets that is placed respectively on both sides of the rail track, that has the shape of cranks corresponding to each other and that includes a mounting hole for installing a below-described shaft, a roller that is rotatably coupled to the upper end of the bracket so as to be mounted on the web and slide, and a shaft that penetrates the roller, that is coupled to the roller and that is inserted into and fixed to the mounting hole. The roller assembly with the configuration may have a simple structure, may be easily assembled and disassembled and may ensure durability.

10 Claims, 5 Drawing Sheets

(51) Int. Cl.
*B65G 39/09* (2006.01)
*B65G 39/10* (2006.01)
*F16C 13/00* (2006.01)
*B65G 9/00* (2006.01)

(52) U.S. Cl.
CPC ............ *B65G 39/10* (2013.01); *F16C 13/006* (2013.01); *B65G 2207/26* (2013.01); *B65G 2207/32* (2013.01); *B65G 2812/182* (2013.01); *F16C 2326/58* (2013.01)

(58) Field of Classification Search
CPC ............ B65G 2207/26; B65G 2207/32; B65G 2812/182; F16C 13/006; F16C 2226/74; F16C 2326/58
See application file for complete search history.

(56) References Cited

U.S. PATENT DOCUMENTS

| | | | | |
|---|---|---|---|---|
| 4,993,328 | A | * | 2/1991 | Wendt .................... B65G 17/20 105/150 |
| 5,156,533 | A | * | 10/1992 | Hoffman ................. B60B 17/02 104/89 |
| 5,398,618 | A | * | 3/1995 | McMullen ............ B61B 10/022 105/148 |
| 5,566,623 | A | * | 10/1996 | Wareham ............... B65G 17/20 104/95 |
| 6,948,433 | B2 | * | 9/2005 | Hoffmann .............. B65G 39/06 105/148 |

FOREIGN PATENT DOCUMENTS

| | | |
|---|---|---|
| KR | 2020130006948 | 12/2013 |
| KR | 101700279000 | 1/2017 |

\* cited by examiner

[FIG. 1]
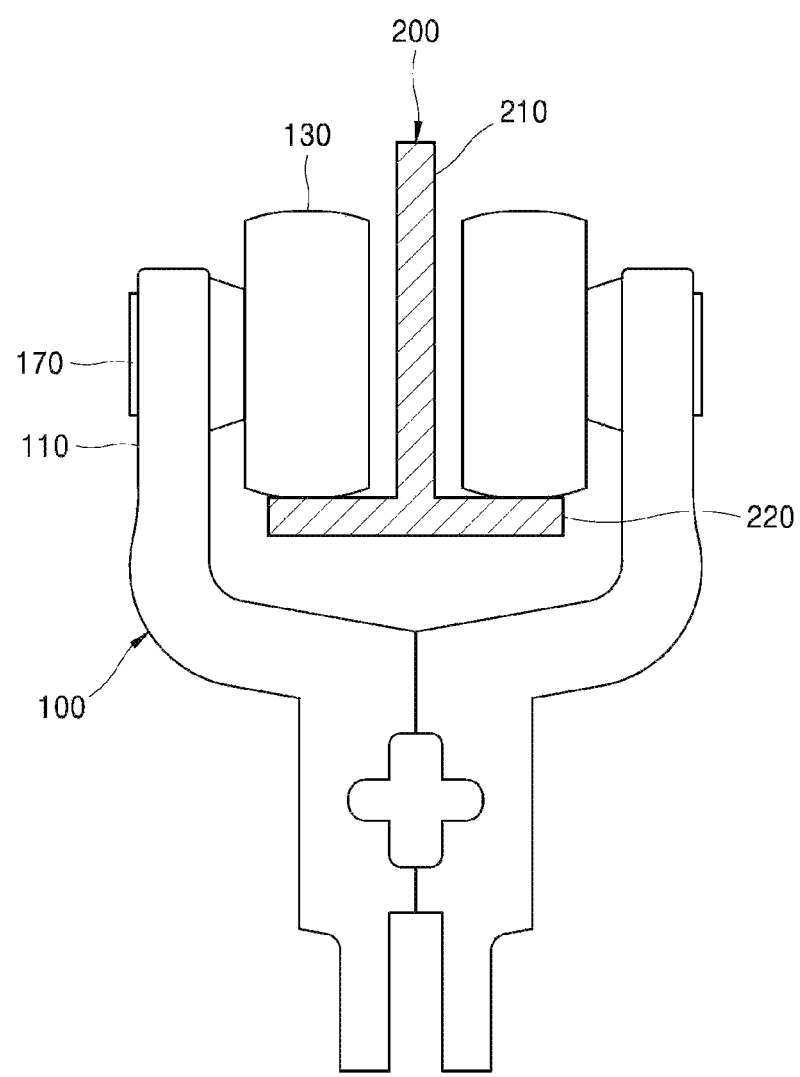

[FIG. 2]
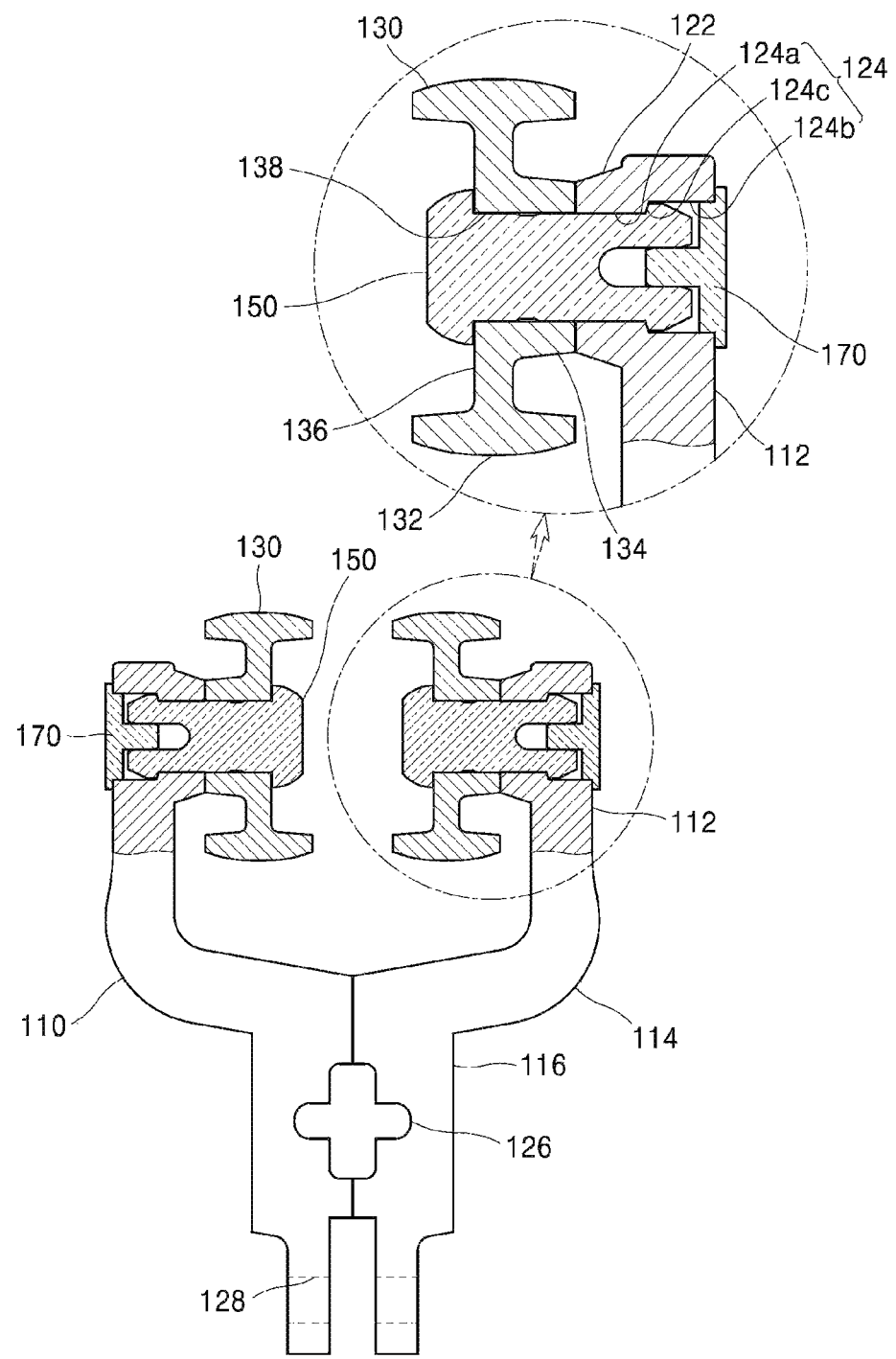

[FIG. 3]
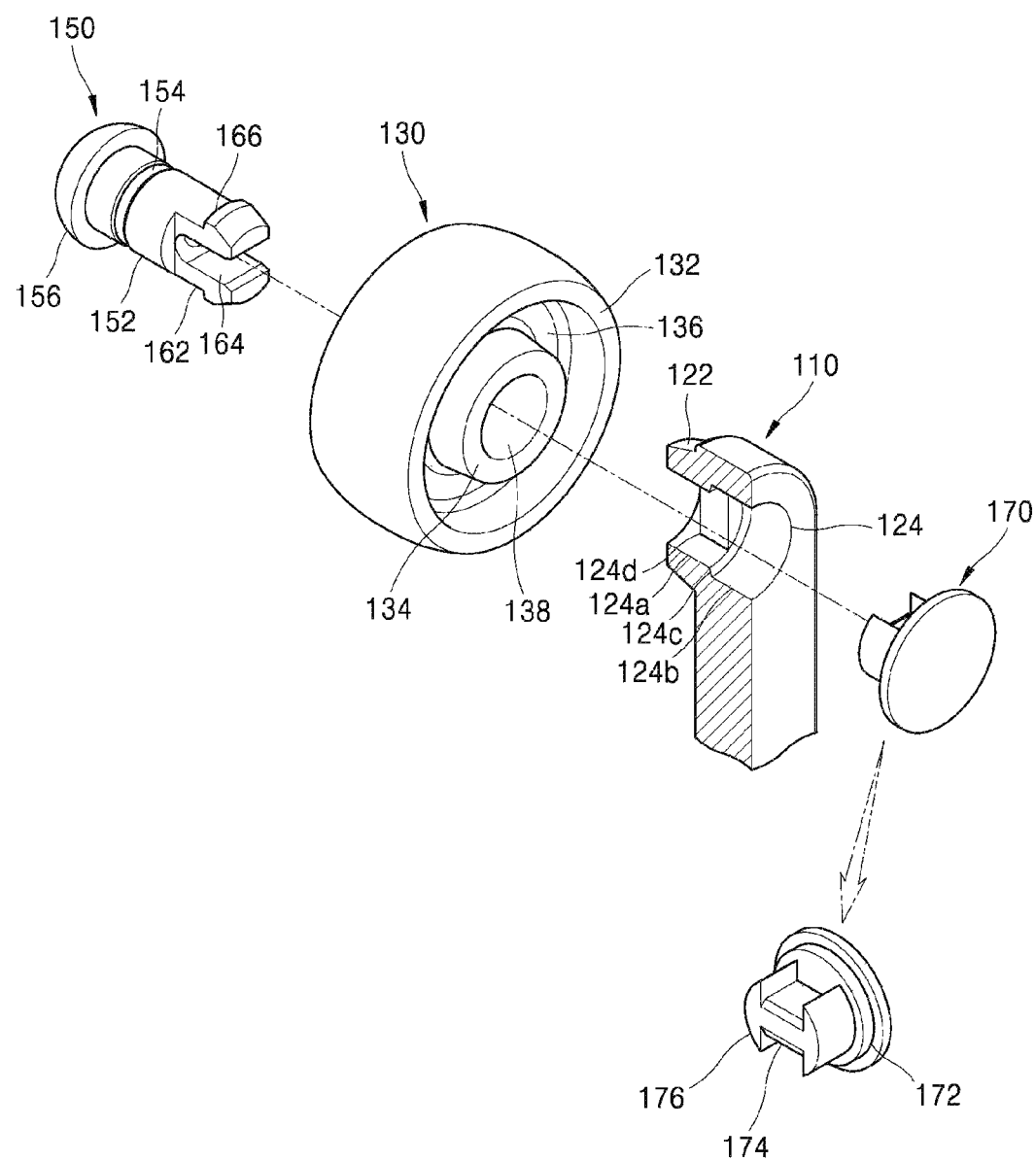

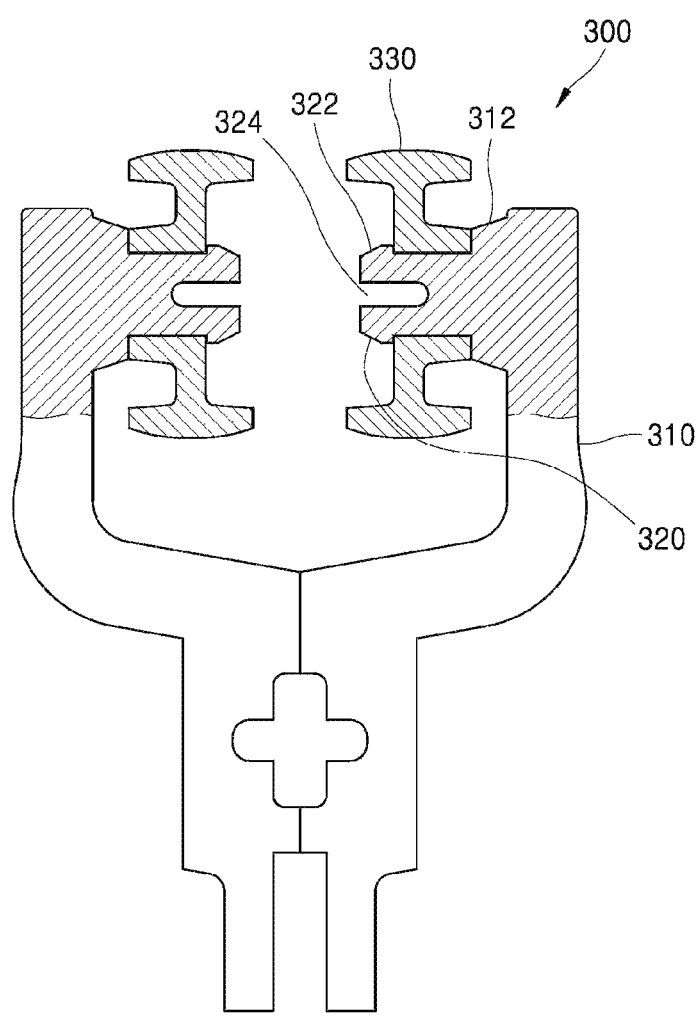
[FIG. 4]

【FIG. 5】
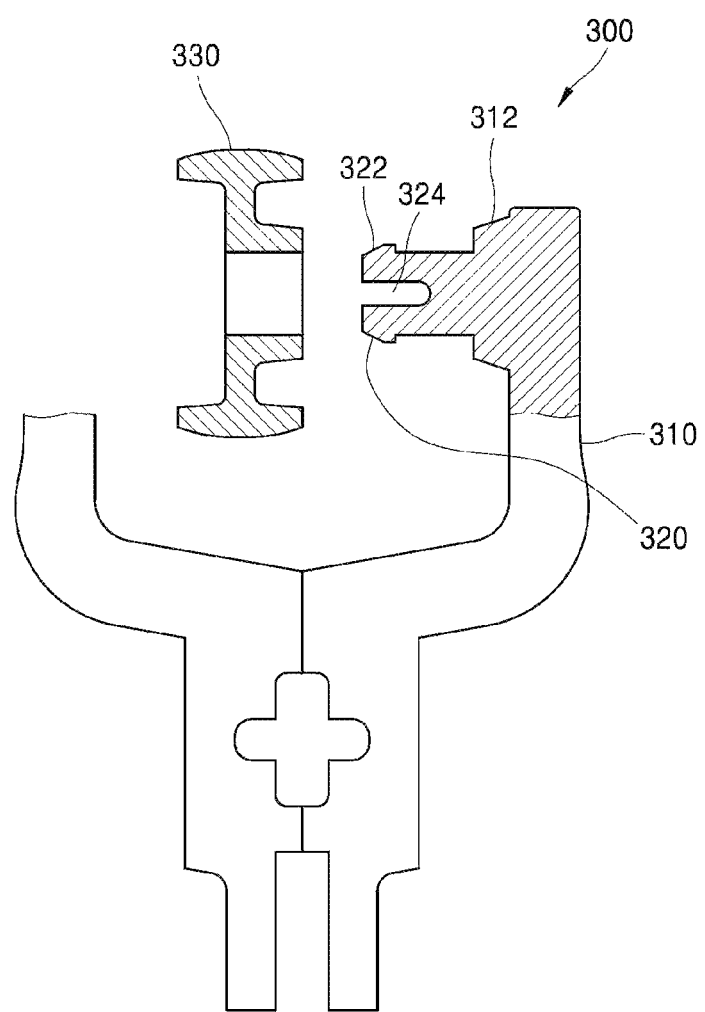

TROLLEY CONVEYOR ROLLER ASSEMBLY

CROSS-REFERENCE TO RELATED APPLICATION(S)

This application is the national phase of PCT Application No. PCT/KR2018/010114 filed on Aug. 31, 2018, which in turn claims priority to Korean Application No. 10-2017-0113740 filed on Sep. 6, 2017, the disclosures of which are incorporated herein by reference in their entireties.

BACKGROUND

Technical Field

The present disclosure relates to a roller assembly for a trolley conveyor and, more specifically, to a roller assembly for a trolley conveyor that has a simple structure, is easily assembled and disassembled and ensures durability.

Background Art

In general, slaughtering is a process of removing feathers from chickens and eviscerating the chickens to manufacture whole chickens. After slaughtering, the whole chickens are cut into pieces and manufactured as raw meat or additionally processed.

The process of slaughtering includes hanging chickens on a conveyor and placing the chickens into a processing line, stunning the chickens with electric current, bleeding out the chickens, scalding the chickens, removing feathers from the chickens and eviscerating the chickens.

A conveyor that transports raw chickens or whole chickens in the process of slaughtering is an overhead type trolley conveyor that moves along a rail track installed on the ceiling.

In Korean Utility Model No. 20-0368337 (Nov. 10, 2004), an overhead type trolley conveyor (hereinafter referred to as "trolley conveyor") is disclosed.

A conventional trolley conveyor includes a roller assembly 12-20 that moves along a rail track 10. The roller assembly 12 to 20 includes a pair of brackets 12 that is placed respectively on both sides of the rail track 10, and a rolling means 16 to 20 for sliding the bracket 12. The rolling means 16 to 20 includes a hub 16 that is connected with the bracket 12 by a fixing bolt 17, a wheel 18 that is rotatably installed outside the hub 16, and a ball bearing 20 that is interposed between the hub 16 and the wheel 18.

In the trolley conveyor with the above-described structure, load is applied to the rolling means 16 to 20 for sliding the bracket 12 when objects to be transported such as raw chickens or whole chickens are transported and stopped. Accordingly, components such as the hub 16, the wheel 18, and the bearing 20 are made of metal so as to maintain rigidity of the rolling means 16 to 20.

However, the hub 16, the wheel 18, and the bearing 20 that are made of metal make noise and cause friction due to contact at the time of operating the trolley conveyor. In worse cases, dust such as metallic powder, and the like is caused by friction among the hub 16, the wheel 18, and the bearing 20.

Recently, hubs 16 and wheels 18 made of synthetic resins have been used to reduce noise and prevent dust from being generated. However, the hubs 16 and wheels 18 made of synthetic resins have strength lower than bearings 20 made of metal. Accordingly, the hubs and wheels are easily broken due to the load that is applied when the trolley conveyor operates and stops. Further, noise that is generated when the trolley conveyor operates is not reduced significantly. Therefore, there is a need for a new roller assembly.

SUMMARY

As a means to solve the above-described problems, the present disclosure provides a roller assembly for a trolley conveyor that has a simple structure, is easily installed and disassembled and ensures durability.

According to the present disclosure, a roller assembly for a trolley conveyor that moves along a rail track including a flange and a web includes a pair of brackets that is placed respectively on both side of the rail track, that has the shape of cranks corresponding to each other and that includes a mounting hole for installing a below-described shaft, a roller that is rotatably coupled to the upper end of the bracket so as to be mounted on the web and slide, and a shaft that penetrates the roller, that is coupled to the roller and that is inserted into and fixed to the mounting hole.

The mounting hole includes a holding projection for fixing the shaft therein, and the shaft comprises a holding hook that has the shape of a cantilever elastically deformable and corresponding to the holding projection in an end portion thereof.

The shaft includes a body that has the shape of a rod extending in one direction, a stopper that is formed one end of the body, and the holding hook that is provided at the other end of the body. In this case, a pair of the holding hooks is arranged in parallel, and a slit for elastic deformation is provided between the holding hooks.

A lubricating groove is formed along the perimeter of the body, and a semisolid lubricant may be injected into the lubricating groove.

The mounting hole includes a small diameter part through which the holding hook passes and a large diameter part on which the holding hook is mounted. In this case, the holding projection is formed between the small diameter part and large diameter part.

The holding hook is configured to have a width less than a diameter of the shaft, and the small diameter part includes a protruding part that prevents the shaft from rotating while contacting the lateral surface of the holding hook.

The present disclosure with the above-described configuration is a device for fixing a roller to a bracket using a shaft, and the device has a simple structure and is easily installed and disassembled. When each component is made of synthetic resins, a roller assembly may be lightened, and load applied to a trolley conveyor line may be reduced.

According to the present disclosure, a lubricant is injected between a roller and a shaft so as to reduce friction and to improve durability, thereby making it possible to reduce noise that is generated when a trolley conveyor operates and to extend the lifespan of a product.

BRIEF DESCRIPTION OF THE DRAWINGS

FIG. 1 is a front view illustrating a roller assembly for a trolley conveyor according to an embodiment of the present disclosure.

FIG. 2 is an enlarged view illustrating a part of a roller assembly for a trolley conveyor according to an embodiment of the present disclosure.

FIG. 3 is an exploded view illustrating a part of a roller assembly for a trolley conveyor according to an embodiment of the present disclosure.

FIG. 4 is a front view illustrating a roller assembly for a trolley conveyor according to another embodiment of the present disclosure.

FIG. 5 is an exploded view illustrating a roller assembly for a trolley conveyor according to another embodiment of the present disclosure.

DETAILED DESCRIPTION

Embodiments of the present disclosure will be described in detail with reference to the attached drawings. Like reference numerals denote like elements throughout the attached drawings and written description even though the like elements are illustrated in different drawings.

As illustrated in FIG. 1, a roller assembly for a trolley conveyor (hereinafter referred to as "roller assembly") 100 according to an embodiment of the present disclosure is a device for transporting raw chickens or whole chickens to be transported along a rail track 200 installed on the ceiling of a slaughter factory.

The rail track 200 used in this embodiment is an overhead type rail track that is installed on the ceiling of a slaughter factory. In the rail track, a flange 210 that is arranged perpendicularly and a web 220 that is arranged horizontally cross and have the shape of a reversed T. In this case, a roller 130 of the roller assembly 100 is placed respectively on both sides of the flange 210 and rotates while contacting the upper surface of the web 220, such that the roller assembly 100 slides along the rail track 200.

The roller assembly 100 transports raw chickens or whole chickens to be transported while sliding along the rail track 200. The roller assembly includes a bracket 110 that encircles the rail track 200, a roller 130 that is installed at the upper end of the bracket 110 and that contacts the rail track 200, a shaft 150 that rotatably supports the roller 130, and a wedge 170 that stretches and fixes the end portions of the shaft 150.

With reference to FIGS. 2 to 3, each element of the roller assembly 100 will be described as follows.

The bracket 110 has a doubly bent crank shape. That is, the bracket includes a first member 112 that extends upward and downward, a second member 114 that is bent to the left (or right) at the lower end of the first member 112, and a third member 116 that is bent downward at the end portion of the second member 114.

The first member 112 includes a mounting protrusion 122 for installing the roller 130 at the upper end thereof. The mounting protrusion 122 protrudes inward from the upper end of the first member 112 and has a tapered shape where the end portion of the mounting protrusion 122 toward the roller 130 has a diameter smaller than that of the end portion of the mounting protrusion 122 toward the first member 112. The mounting protrusion 122 spaces the roller 130 at the upper end of the bracket 110 apart from the first member 112 so as to prevent the roller 130 from interfering with the first member 112 when the roller 130 rotates. In this case, the diameter of the end portion of the mounting protrusion 122 is preferably the same as or smaller than the diameter of the inner wheel 134 of the roller 130.

The first member 112 includes a mounting hole 124 for installing the shaft 150 at the upper end thereof. The mounting hole 124 is configured to penetrate the first member 112 and the mounting protrusion 122 and includes a small diameter part 124a that is placed at the front end of the mounting hole in the direction where the shaft 150 is inserted, and a large diameter part 124b that is placed at the rear end of the mounting hole in the direction where the shaft 150 is inserted. Additionally, a holding projection 124c for fixing the shaft 150 is formed between the small diameter part 124a and the large diameter part 124b. That is, when the shaft 150 is installed, the below-described holding hook 162 penetrates the small diameter part 124a, is mounted onto the large diameter part 124b, is held by the holding projection 124c and then is fixed.

The small diameter part 124a includes a protruding part 124d that contacts the lateral surface of the holding hook 162 when the shaft 150 is installed. The protruding part 124d contacts the lateral surface of the holding hook 162 to prevent the shaft 150 from rotating.

The third member 116 includes an insertion groove 126 into which a chain (invisible) for moving the roller assembly 100 is inserted, inside the middle thereof. The insertion groove 126 includes an installing hole 128 in which a shackle (invisible) for fixing objects to be transported such as a raw chicken, a whole chicken, and the like is installed, in the lower portion thereof.

A pair of brackets 110 with the above-described shape is placed respectively on both sides of the rail track 200 and face each other. In this case, the pair of brackets 110 is coupled so as to contact the third member 116 and form a unit. The unit formed by coupling the pair of brackets 110 has a Y shape, the upper portion of which is divided, so as to encircle the rail track 200.

The roller 130 includes an outer wheel 132, an inner wheel 134 that is placed inside the outer wheel 132, and a spoke 136 that connects the outer wheel 132 and the inner wheel 134.

The outer wheel 132 is a portion that contacts the web 220. The outer wheel 132 has a pipe shape that extends leftward and rightward, and the outer circumferential surface of the outer wheel has a curved shape. When the outer circumferential surface of the outer wheel 132 has a curved shape, a contact surface between the outer wheel 132 and the web 220 is minimized. Thus, friction caused by contact between the outer wheel 132 and the web 22 may be reduced when the roller assembly 100 moves.

The inner wheel 134 is a portion that contacts the shaft 150. The inner wheel 134 has a pipe shape that protrudes outward from one surface of the spoke 136, has a tapered shape where the end portion of the inner wheel 134 toward the first member 112 has a diameter smaller than that of the end portion of the inner wheel toward the roller 130 and includes a through hole 138 for installing the shaft 150 in the central portion thereof. The inner wheel 134 is formed only on one surface of the spoke 136 such that a stopper 156 of the shaft 150 is placed in the roller 130. To put it another way, when the roller assembly 100 moves, the stopper 156 that protrudes from the roller 130 is prevented from interfering with the roller assembly.

The spoke 136 connects the outer wheel 132 and the inner wheel 134 and supports the outer wheel 132. The spoke 136 has the shape of a plate that has a thickness less than a width of the outer wheel 132, and, as described above, the inner wheel 134 protrudes outward from one surface of the spoke 136.

The shaft 150 includes a body 152 with the shape of a rod that extends in one direction. A lubricating groove 154 is formed in the perimeter of the body 152, specifically, in the perimeter, contacting the inner wheel 134 of the roller 130, of the body, and a semisolid lubricant is injected into the lubricating groove 154.

When the lubricating groove 154 is formed in the perimeter of the shaft 150 and a lubricant is injected into the lubricating groove, friction and noise generated between the roller 130 and the shaft 150 may be reduced at the time operating a trolley conveyor, thereby making it possible to improve durability of the roller assembly 300.

The body 152 includes a stopper 156 on one end thereof so as to prevent the roller 130 coupled to the shaft 150 from separating from the shaft 150 while the body includes a holding hook 162 on the other end thereof so as to fix the shaft 150 to the bracket 110.

A pair of holding hooks 162 extends from the end portion of the body 152 and is arranged in parallel, and a slit 164 is provided between the pair of the holding hooks 162. The pair of holding hooks 162 has the shape of a cantilever. When external force is applied, the pair of holding hooks is compressed toward the slit 164 while when the external force is removed, the pair of holding hooks is stretched in the opposite direction.

The holding hook 162 includes a holding protrusion 166 that is fixed to the holding projection 124c, at the end thereof. The holding protrusion 166 has a tapered shape, the front end of which has a diameter smaller than the rear end thereof, and the rear end of the holding protrusion protrudes further outward than the holding hook 162 so as to be fixed to the holding projection 124c.

The holding hook 162 has a width less than a diameter of the body 152, and when the shaft 150 is installed, the holding hook contacts the protruding part 124d of the small diameter part 124a. Thus, the holding hook prevents the shaft 150 inserted into the mounting hole 124 from rotating.

The shaft 150 with the above-described structure penetrates the roller 130 and is inserted into and fixed to the mounting hole 124. Along the way, the pair of holding hooks 162 is compressed when contacting the small diameter part 124a and stretched when passing the small diameter part 124a and mounted onto the large diameter part 124b, and, at the same time, the holding protrusion 166 is held by the holding projection 124c and fixed to the same.

Preferably, a length of the body 152 of the shaft 150, i.e., a distance from the stopper 156 to the holding protrusion 166 is the same as a total of lengths of the inner wheel 134 and the small diameter part 124a or less than the total.

When a length of the body 152 of the shaft 150 is less than a total of lengths of the inner wheel 134 and the small diameter part 124a, the bracket 110 and the shaft 150 may be perfectly coupled and fixed.

A wedge 170 is installed in the mounting hole 124, stretches and fixes the end portions of the shaft 150 and, at the same time, prevents foreign substances from being introduced through the mounting hole 124. Specifically, the wedge includes a cover 172 that is inserted into the mounting hole 124, a stretching protrusion 174 that is formed on one surface of the cover 172, and a sealing protrusion 176 that is formed in both ends of the stretching protrusion 174.

The cover 172 has the shape of a multi-step circular plate such that a part of the cover is inserted into the mounting hole 124. The stretching protrusion 174 is a portion that is inserted into the slit 164 when the wedge 170 is installed, and the end portion of the stretching protrusion has a tapered shape so as to be easily inserted into the slit 164. The sealing protrusion 176 prevents foreign substances from being introduced between the wedge 170 and the mounting hole 124 and closely contacts the large diameter part 124b of the mounting hole 124.

Manufacturing the roller assembly 100 with the above-described simple structure does not cost much, and the roller assembly 100 may be easily manufactured, easily installed and disassembled and easily repaired. When each component of the roller assembly 100 is made of a synthetic resin, weight of the roller assembly 100 is reduced, thereby making it possible to reduce load applied to a trolley conveyor line.

FIGS. 4 and 5 are views illustrating a roller assembly 300 according to another embodiment of the present disclosure.

The roller assembly 300 according to this embodiment includes a pair of brackets 310 that is arranged respectively on both side of a rail track (invisible) and that have the shape of cranks corresponding to each other, and a roller 330 that is rotatably coupled to the upper end of the bracket 310 so as to be mounted onto the rail track and slide.

The roller 330 has the same shape and structure as those of the roller 130 of one embodiment that has been described above. Accordingly, description of the roller 130 will be omitted from the following description.

Unlike the bracket of one embodiment, the bracket 310 of this embodiment includes an integrally formed shaft 320 that rotatably supports the roller 330. That is, the bracket 310 has the shape of a crank that is doubly bent and includes a mounting protrusion 312 at the upper end thereof, and the shaft 320 is integrally formed on one surface of the mounting protrusion 312.

The shaft 320 has the shape of a rod that extends in one direction and includes a holding hook 322 for fixing the roller 330 at the end thereof. A pair of holding hooks 322 is arranged in parallel at the end portion of the shaft 320, and a slit 324 for elastic deformation is formed between the pair of holding hooks 322. To put it another way, the pair of holding hooks 322 has the shape of a cantilever. The holding hooks are compressed while penetrating the roller 330, stretched after penetrating the roller 330 and fixes the roller 330.

According to the roller assembly 300 of this embodiment, the shaft 320 that supports the roller 330 is integrally formed with the bracket 310. Thus, the roller assembly may have a simple structure, be easily manufactured and installed and require fewer working hours, thereby improving productivity.

The present invention has been described with reference to the embodiments. The embodiments are provided only as examples of the invention. It will be apparent to one having ordinary skill in the art that the invention may be modified in various forms without departing from the technical spirit of the invention. Therefore, the protection scope of the invention is to be defined only according to the appended claims, and the full scope of equivalents to which such claims are entitled is to be included in the scope of the invention.

The invention claimed is:

1. A roller assembly for a trolley conveyor that moves along a rail track including a flange and a web, comprising:
   a pair of brackets that is placed respectively on opposite sides of the rail track, that has the shape of cranks corresponding to each other and that comprises a mounting hole;
   a roller that is rotatably coupled to an upper end of the brackets so as to be mounted on the web and slide; and
   a shaft that penetrates the roller, that is coupled to the roller and that is inserted into and fixed to the mounting hole,
   wherein the mounting hole comprises a holding projection for fixing the shaft therein, and the shaft comprises a holding hook that has the shape of a cantilever elastically deformable and corresponding to the holding projection, in an end portion thereof.

2. The roller assembly for a trolley conveyor of claim 1, wherein the shaft comprises a body that has the shape of a rod extending in one direction, a stopper that is formed at a first end of the body, and the holding hook that is provided at a second end of the body, and a pair of the holding hooks is arranged in parallel, and a slit for elastic deformation is provided between the holding hooks.

3. The roller assembly for a trolley conveyor of claim 2, wherein a lubricating groove is formed along a perimeter of the body.

4. The roller assembly for a trolley conveyor of claim 2, wherein the mounting hole comprises a small diameter part through which the holding hook passes and a large diameter part on which the holding hook is mounted, and the holding projection is formed between the small diameter part and large diameter part.

5. The roller assembly for a trolley conveyor of claim 4, wherein the holding hook has an end portion that is tapered such that the holding hook is elastically deformed when the holding hook contacts the small diameter part.

6. The roller assembly for a trolley conveyor of claim 5, wherein the holding hook is configured to have a width less than a diameter of the shaft, and the small diameter part comprises a protruding part that prevents the shaft from rotating while contacting a lateral surface of the holding hook.

7. The roller assembly for a trolley conveyor of claim 6, wherein the roller assembly for a trolley conveyor further comprises a wedge that is installed in the mounting hole and stretches end portions of the shaft.

8. The roller assembly for a trolley conveyor of claim 7, wherein the wedge comprises a cover that is inserted into the mounting hole, a stretching protrusion that protrudes from one side of the cover, that is inserted into the slit and that stretches the end portions of the shaft, and a sealing protrusion that is formed on both sides of the stretching protrusion, that closely contacts the mounting hole and that prevents foreign substances from being introduced.

9. A roller assembly for a trolley conveyor that moves along a rail track including a flange and a web, comprising:

a pair of brackets that is placed respectively on opposite sides of the rail track and that has the shape of cranks corresponding to each other a roller that is rotatably coupled to an upper end of the brackets so as to be mounted on the web and slide;

a shaft that protrudes inward from the upper end of the brackets and that comprises the roller, wherein the shaft comprises a holding hook that has the shape of a cantilever, is elastically deformable and that penetrates the roller and is fixed to the roller, in an end portion thereof.

10. The roller assembly for a trolley conveyor of claim 9, wherein a pair of the holding hooks is arranged in parallel, and a slit for elastic deformation is provided between the holding hooks.

* * * * *